March 1, 1960

H. F. FAUGHT 2,926,488

STRESS LIMITING CONTROL SYSTEM FOR AN
AVIATION GAS TURBINE POWER PLANT

Filed April 21, 1954

INVENTOR
HAROLD F. FAUGHT

2,926,488

STRESS LIMITING CONTROL SYSTEM FOR AN AVIATION GAS TURBINE POWER PLANT

Harold F. Faught, Middletown Heights, Pa., assignor, by mesne assignments, to the United States of America as represented by the Secretary of the Navy Application April 21, 1954, Serial No. 424,685

3 Claims. (Cl. 60—35.6)

This invention relates to an aviation gas turbine power plant, more particularly to a control system for an aviation gas turbine power plant, and has for an object to provide an improved control system therefor, permitting reduction in weight of the power plant without sacrifice in maximum usable thrust.

It has been found that at high flight speeds at low altitudes the various limiting mechanical stresses in an aviation gas turbine power plant, for example a turbojet power plant, tend to become excessive because of increased pressures in the power plant. The above effect increases considerably when the atmospheric or ambient temperature is reduced below normal. For example, a turbojet power plant operating at rated values of angular velocity or r.p.m., turbine inlet temperature and maximum ram pressure ratio develops about 50% more thrust at $-67°$ F. (termed a U.S. Navy cold day) than at $+59°$ F. (termed a standard day).

In order to withstand the increased stresses under the above conditions, the power plant and the airplane for which it is designed must be built stronger. A power plant designed to meet the above increases in stress on a U.S. Navy cold day is approximately 10% heavier than necessary if the thrust and, accordingly, the stresses incurred are limited to a standard day maximum value.

It has been proposed to control the rotational speed of an aviation gas turbine power plant in order to permit some reduction in the designed weight of the power plant. With the above arrangement, the power plant would still be heavier or more powerful than required by the airplane for which it is intended.

It is another object of the invention to provide a control system for accurately and precisely limiting the thrust and stresses of an aviation gas turbine power plant regardless of variations in the ambient temperature.

A further object of the invention is to provide an aviation gas turbine power plant with a thrust limiting control arrangement permitting the power plant to identically match the airplane for which it is designed.

These and other object are effected by the invention as will be apparent from the following description taken in connection with the accompanying drawings, forming a part of this application, in which.

Figure 1:
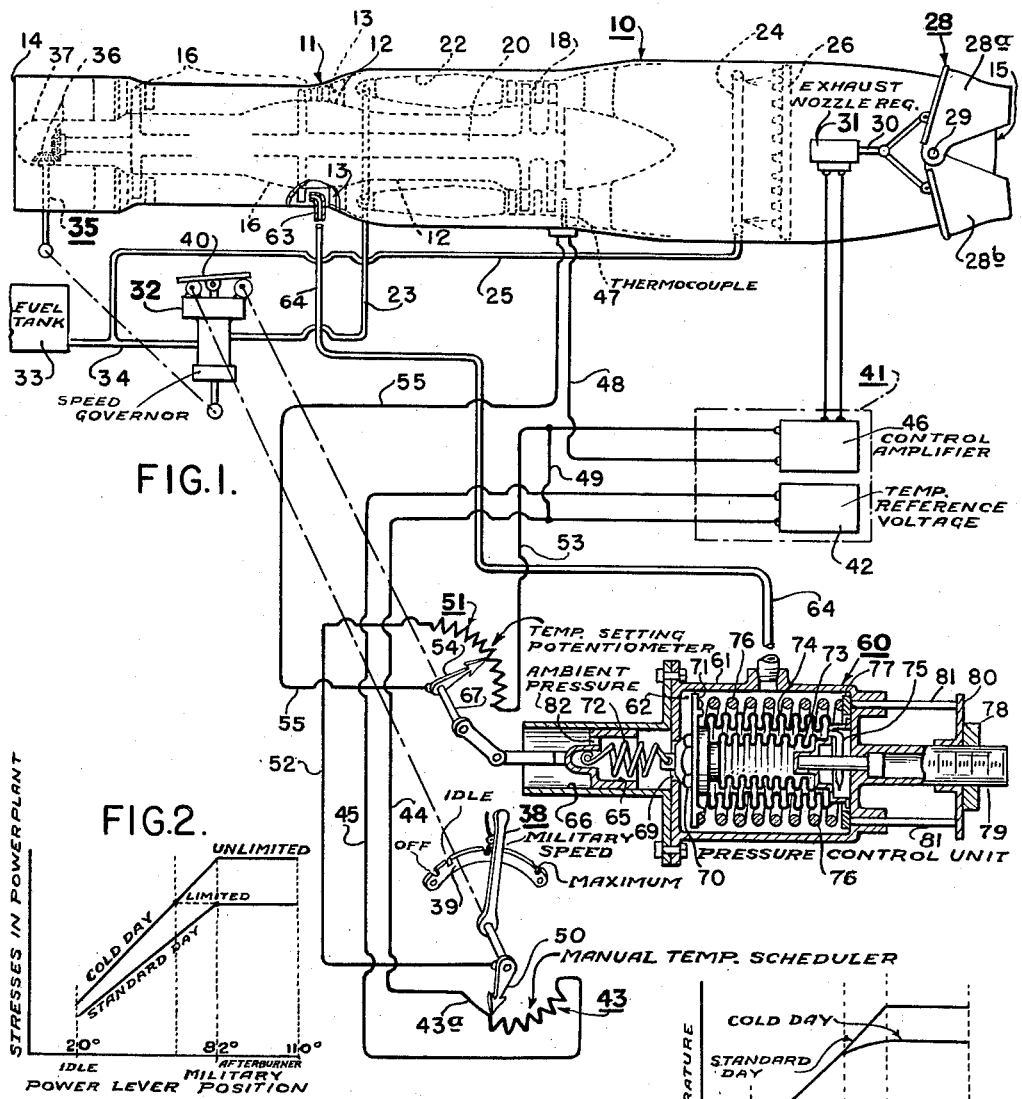
Fig. 1 is a schematic diagram showing the invention incorporated in a substantially conventional aviation gas power plant of the turbojet type equipped with afterburner and variable exhaust nozzle apparatus.

Referring to the drawings in detail, especially Fig. 1, the control system of the invention is illustrated in conjunction with a typical aviation gas power plant 10 of the turbojet type, shown schematically and having the usual components disposed within an outer tubular casing strucure 11. An inner core structure 12 together with the casing 11 defines an annular passageway 13 having an inlet 14 and an exhaust outlet or nozzle 15. The power plane components include a compressor 16 operatively connected to a turbine 18 by means of a shaft 20. Disposed intermediate the compressor and the turbine, primary combustion apparatus 22 is provided wherein fuel admitted thereto by a fuel supply line 23 is ignited, forming hot motive gases which are expanded through the turbine 18 to drive the compressor 16 and then are expelled through the exhaust outlet 15 in the form of a jet providing a propulsive thrust. As air enters the inlet 14, the compressor 16 pressurizes it and delivers it to the combustion apparatus 22, thereby furnishing air for the combustion of the fuel admitted thereto. In turn, the turbine 18 is motivated by hot products of combustion, driving the shaft 20 and the compressor 16.

Although not entirely essential, turbojets of the above type are often provided with afterburning apparatus including a fuel spray pipe 24 disposed downstream of the turbine 18 and fed by fuel flowing through a fuel supply line 25. Flameholding structure 26 disposed downstream of the afterburning spray pipe 24 is utilized to anchor the afterburner flame, as well known in the art.

The exhaust nozzle 15 is further provided with area varying mechanism 28 of any desired type, for example, a pair of hinged eyelid members 28a and 28b pivoted at 29 and joined to a common actuating member 30 for joint operation. The mechanism 28 is actuated by a power actuator 31, which may be electrically operated.

The fuel supply line 23 to the primary combustion apparatus 22 is connected to a conventional speed governor 32, which in turn is connected to a fuel tank 33 by a fuel supply line 34. The speed governor 32 is operatively connected to the engine shaft 20 by a power take-off arrangement 35, for example, a pair of gears 36 disposed in a fairing member 37 provided at the inlet 14 of the turbojet engine. Thus, fuel to the combustion apparatus 22 is varied by the speed governor 32 to maintain a selected angular velocity of the engine shaft as desired. The angular velocity of the shaft 20 may be varied as desired by means of a power lever 38 operatively connected to the speed governor and having a range of travel from "off" to "maximum" indicated on a quadrant 39. Movement of the power lever to various positions on the quadrant 39 results in adjustment of an adjusting member 40 in the speed governor, which in turn serves to adjust the effective range limits of the speed governor for proper flow of fuel therethrough to maintain the selected angular velocity of the engine shaft in accordance with the position of the power lever.

Electrical automatic temperature control apparatus generally indicated 41 is utilized for controlling the operation of the exhaust nozzle actuator 31 the effective range limits of which are determined by the position of the power lever 38 and temperature conditions in the engine. The temperature control apparatus 41 has a temperature reference voltage unit 42 connected to a manual temperature scheduling potentiometer 43 by lines 44 and 45, and a control amplifier unit 46 connected to a thermocouple 47 disposed downstream of the turbine 18 by a line 48 and to one end of the manual temperature scheduling potentiometer 43 by a line 49.

The manual temperature scheduling potentiometer 43 has a movable contact member 50 operatively connected to the power lever 38 and electrically connected to one end of a temperature setting potentiometer 51 by a line 52. The other end of the temperature setting potentiometer 51 is connected to the control amplifier unit 46 by a line 53. The temperature setting potentiometer is also provided with a movable contact member 54 connected to the thermocouple 47 by means of a line 55.

With the above arrangement the area of the exhaust nozzle 15 is varied by the mechanism 28 in accordance with the position of the power lever 38 to maintain a desired temperature in the engine for each new position of the power lever.

Figures 4, 5:
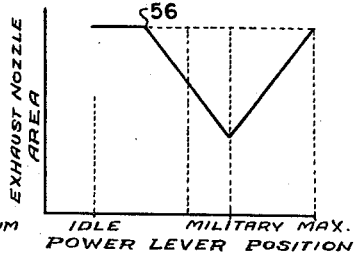
Figs. 3 and 4 are charts showing comparisions between other typical power plant conditions on a U.S. Navy cold day and a standard day.
Fig. 5 is a chart illustrating typical optimum exhaust nozzle area for various power lever positions.

As shown in Fig. 5, the exhaust nozzle area is at a maximum value for a power lever position ranging from "idle" to a position somewhat in advance of "idle," indicated at 56 on the chart. As the power lever is advanced from the position corresponding to point 56 to a "military" thrust setting, the area of the nozzle is uniformly reduced until at the "military" setting it is at its position of minimum area. It will be understood that for any position ranging from "idle" to "military," the primary combustion apparatus 22 is utilized alone to provide the propulsive jet, while for all settings above the "military" thrust to "maximum" thrust, the afterburning apparatus is operated to provide additional heat to the motive gases emitted through the exhaust nozzle. As the power lever is advanced from the "military" setting to the "maximum" thrust setting, the area of the exhaust nozzle is gradually made larger until, at the "maximum" thrust setting of the lever, the area of the exhaust nozzle is at its maximum value.

Figure 3:
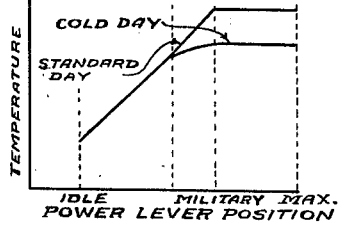

The thermocouple 47 is responsive to the temperature of the motive gases at the turbine 18, and since the temperature of the motive gases at the turbine is a direct function of the amount of fuel admitted to the primary combustion apparatus 22 by the speed governor 32, the temperature of the motive gases rises as the power lever is advanced to the "military" position (Fig. 3). As the power lever is moved from the "off" position to the "military" position, the E.M.F. induced in the thermocouple 47, and providing a signal for the control amplifier unit 46, is modified by the shifting position of the movable contact member 50 of the manual temperature scheduling potentiometer 43 to effect the scheduling of the exhaust nozzle indicated in Fig. 5.

As thus far described, the system is somewhat conventional and operates satisfactorily to provide a thrust responsive in value to the position of the power lever, provided the aircraft is flying in an ambient of 59° F. (standard day).

Figure 2:
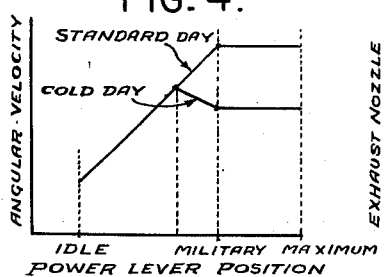
Fig. 2 is a chart comparing typical stress conditions in the power plant of Fig. 1 on a standard day with a U.S. Navy cold day, for various positions of the power lever.

The typical standard day stress, temperature and angular velocity conditions existing in the power plant are shown in the charts of Figs. 2, 3 and 4 respectively.

In Fig. 2, it will be noted that the stresses in the power plant on a standard day rise in a straight line from the "idle" position to the "military" position, while in the range from "military" to "maximum" (afterburning range) the stresses in the power plant remain the same. Similarly (Fig. 3), the temperature in the power plant including the outlet end of the turbine 18 rises continuously from the "idle" position to the "military" position and then remains constant from the "military" position to the "maximum" position (afterburning range). In like manner, as shown in Fig. 4, the angular velocity of the power plant rises gradually from the "idle" position to the "military" position and then remains constant from the "military" position to the "maximum" position of the power lever (afterburning range). The reason for the constant value of stresses, temperature and angular velocity in the afterburning range is that the additional thrust is imparted by the afterburning apparatus which is disposed downstream of the turbine 18 and is effective to heat the motive gases prior to exit from the exhaust nozzle 15 to increase the velocity of the propulsive jet.

However, as mentioned heretofore, the effect of the ambient temperature on the thrust of the power plant is such that when the temperature varies the thrust varies inversely proportionately until at −67° F. (U.S. Navy cold day) the increase in thrust is approximately 50% greater than a standard day.

The stresses, temperature and angular velocity conditions existing in the power plant on a U.S. Navy cold day are also illustrated in Figs. 2, 3 and 4, respectively, for comparison purposes.

Referring to Fig. 2, it will be noted that on a U.S. Navy cold day the stresses in the power plant rise in value much more rapidly than on a standard day, so that if means is not provided for limiting the power plant thrust it attains a value considerably higher than desired. The stresses exceed the maximum value when the power lever is moved to a position slightly below "military" and continue to increase as the power lever is advanced to the "military" position. During the afterburning range, the stresses in the power plant remain at a constant high value. According to the invention the stresses are limited in a manner, which will subsequently be described, so that they do not exceed the standard day value.

The following represent parameters relating to power plant performance: $N/\sqrt{T}$ and $T_4/T$ where:

$N$ = angular velocity of the power plant
$T$ = the absolute temperature anywhere in the power plant
$T_4$ = turbine temperature In the following:

$N/\sqrt{T_2}$ equals $K_1$, and $T_4/T_2$ equals $K_2$, where $T_2$ has been selected to represent compressor inlet temperature, $K_1$ equals an angular velocity constant of the power plant and $K_2$ equals a temperature ratio constant of the power plant.

$$N^2/T_2 = K_1^2$$
$$N^2/T_2 \div T_4/T_2 = N^2/T_4 = K_1^2/K_2$$

Since the absolute pressure in the power plant is a function of the absolute temperature and the angular velocity of the power plant, according to the invention the angular velocity of the power plant and the turbine temperature may be controlled by controlling the difference in absolute pressure between one point in the power plant and another point.

Although a pressure signal at numerous points in the power plant may be utilized, a suitable pressure signal $P_0$ may be attained at the outlet of the compressor 16. By providing apparatus generally indicated 60 responsive to $P_0$ for controlling both the angular velocity of the power plant and the temperature adjacent the turbine in such a manner that $N/\sqrt{T_2} = K_1$, and $T_4/T_2 = K_2$, the stresses in the power plant may be limited to a predetermined safe design value.

The angular velocity of the power plant and the temperature adjacent the turbine may be controlled by simultaneously regulating the flow of fuel delivered to the primary combustion apparatus 22 and the area of the exhaust nozzle 15.

The pressure responsive apparatus 60 has a housing 61 forming a chamber 62 connected to a pressure probe 63, disposed at the outlet of the compressor 16, by means of a pipe 64. A hollow piston 65 is slidably disposed within a tubular member 66 and connected to a rotatable shaft 67 carrying the movable contact member 54. The shaft 67 is operatively associated with the speed governor adjusting member 40 in a manner to modify the setting of the speed governor obtained by movement of the power lever 38. The housing 61 is provided with a port 69 registering with the open or right hand side of the piston 65 and is further provided with a valve member 70 mounted on a plate 71 and urged into sealing engagement with the port 69 by a spring 72 connected thereto at one end and to the piston at its opposite end. The plate 71 is carried by a pair of bellows 73 and 74, disposed in telescoping relation with each other. The inner bellows 73 and the outer bellows 74 form an annular chamber which is evacuated by means of a tube 75, thereby rendering the valve member 70 responsive to changes in absolute pressure.

A spring member 76 confined between the valve plate 71 and an annular abutment member 77 serves to bias the valve 70 in closing direction. The bias of the spring 76 is adjustable by means of a nut and screw arrangement 78 and 79, respectively, carried by the housing 61. An annular collar 80 carried by the screw member 79 serves to position the abutment member 77 and exerts a force thereon through a plurality of slidable pins 81. Thus, by rotation of the screw 78 the collar 80 may be moved to vary the bias of the spring 76.

A small aperture 82 is provided in the piston 65 and serves to provide a communication between the atmosphere in the chamber 62 and the ambient air when the valve member 70 is in the open position thereby enabling the bellows 74 to respond more quickly to changes of pressure in the chamber 62.

In operation, as the pressure $P_0$ at the outlet of the compressor 16 rises to a maximum safe value for the engine, the pressure $P_0$ is transmitted through the probe 63 to the chamber 62 of the pressure limiting apparatus 60 and causes the bellows 74 to retract with resulting movement in opening direction of the valve member 70. In the range of pressures occurring in the chamber 62 during operation, there exists a small segment of this range in which "hunting" will occur. More specifically, as the pressure in chamber 62 rises to a value just above that which is necessary to initiate compression of the bellows 74 the valve 70 will open thereby decreasing the pressure in chamber 62 via the bleed 82 in the piston 65. This decrease in pressure causes the bellows to extend thereby closing the valve 70 and causing the pressure to build up once again in the chamber 62 and consequently providing repetition of the opening-closing action or "hunting." The spring 72 absorbs these oscillations until the pressure rises to a point where the restricted orifice 82, due to its small diameter, can no longer reduce the pressure sufficiently to close the valve. At this instant the spring 72 no longer absorbs all of the valve movement and the piston 65 is caused to move to the right as viewed in the drawing, thereby rotating the shaft 67 counterclockwise to reduce the setting of the member 40 on the speed governor, thereby reducing the speed setting of the governor to a lower value and causing the governor to reduce the amount of fuel flowing through the conduit 23 to the primary combustion chamber 22.

Simultaneously therewith the movable contact member 54, which is also carried by the shaft 67 of the pressure limiting apparatus is moved in counterclockwise direction to vary the setting of the temperature setting potentiometer 51, thereby reducing the temperature setting of the temperature reference voltage unit 42. As the movable contact 54 is moved in counterclockwise direction, the total series resistance of the two potentiometers 51 and 43 in the circuit to the temperature reference voltage unit 42 is reduced. The control amplifier then transmits a signal to the exhaust nozzle actuator 31 causing it to actuate the area varying mechanism 28 in a direction increasing the area of the exhaust nozzle 15 to reduce the temperature in the power plant.

As the exhaust nozzle is adjusted to a new position of increased area and the governor is adjusted to a position in which fuel flow therethrough is reduced, the temperature in the power plant is reduced and the angular velocity is also reduced causing the pressure $P_0$ of the outlet of the compressor 16 to attain a lower value. Upon stabilization of $P_0$ to the maximum limited value, the valve member 70 and the piston 65 will move to a stable position in which the shaft 67 is positioned to maintain the above engine conditions at the required value.

When it is desired to operate the power plant at maximum value, that is, with the afterburner apparatus 24 in operation, the power lever 38 is moved to the "maximum" thrust position, whereby means (not shown) are actuated causing fuel to flow from the tank 33 through the pipe 25 into the afterburner pipe 24, whereupon, by means not shown, the fuel issuing therefrom is ignited to heat the motive gas discharged by the turbine 18. The heated motive gases flowing through the exhaust nozzle 15 at a higher velocity serve to increase the thrust of the power plant in a manner well known.

Since the pressure limiting mechanism 60 must also operate during the afterburning operation of the power plant to protect the power plant against excess stresses and since the thermocouple 47 is disposed adjacent the turbine 18 where it is sensitive to the temperature therein, means are provided for preventing further adjustment of the manual temperature scheduling potentiometer 43 in the afterburning range. For example, the manual temperature scheduling potentiometer may be provided with a portion 43a having zero resistance, so that as the power lever 38 is moved from the "military" thrust setting to the "maximum" thrust setting and the adjustable contact member 50 is moved over the portion 43a, no further change is made in the setting of the temperature reference voltage unit 42. Thus, it will be seen that the maximum temperature in the region adjacent the turbine 18 is attained at the military thrust setting. Since the afterburner has a tendency to increase the temperature in the power plant and since such increase in temperature is readily detected by the thermocouple 47 and transmitted to the temperature reference voltage unit 42, the signal produced thereby is sufficient to cause the exhaust nozzle actuator 31 to move the exhaust area varying mechanism 28 in opening direction as shown in Fig. 5, thereby preventing undue rise in the turbine 18.

It will be apparent that the invention provides a control system for an aviation gas turbine power plant which permits safe operation by the pilot under all temperature conditions of the ambient, since he need not be concerned with the possible occurrence of excess stresses in the power plant heretofore incident to cold day operation.

It will also be apparent that since the stresses in the power plant are limited to a maximum value consistent with the desired thrust of the power plant, the engine need not be built more heavily or more durable than required and may be designed to much closer limits providing weight and material savings during manufacturing. Also, the airplane may be more lightly designed, since it may be designed to suit a power plant of predetermined thrust rating for all operating conditions.

Although the pressure limiting apparatus 60 has been shown as subjected to the pressure $P_0$ at the outlet of the compressor 16 and to the ambient through the aperture 82, the pressures utilized may be selected in a different manner. For example, the probe 63 may be disposed anywhere within the compressor 16 between its inlet and its outlet. Also, the aperture 82 in the pressure limiting mechanism may be connected to a point upstream of the pressure probe 63 and need not necessarily communicate with the ambient as illustrated.

In addition to the above, the thermocouple 47 may be disposed anywhere upstream of the location illustrated.

While the invention has been shown in but one form, it will be obvious to those skilled in the art that it is not so limited, but is susceptible of various changes and modifications without departing from the spirit thereof.

What is claimed is:

1. In a turbojet power plant having a compressor, a combustion chamber, a turbine operatively connected to said compressor for driving the same, an exhaust nozzle, means for admitting fuel for combustion to said combustion chamber, a speed governor having effective range limits for varying the supply of fuel to the aforesaid means, second means for varying the outlet area of said exhaust nozzle, third means having effective range limits responsive to turbine temperature for actuating the said second means, manually adjustable means for altering the effective range limits respectively of both said governor and said second means; a control means for automatically maintaining the structural stressing of the power plant below a predetermined maximum value which is dependent on pressure in said power plant regardless of ambient atmosphere temperature, comprising, means for sensing a condition indicative of a predetermined magnitude of structural stresses in said power plant, fourth means operably connecting said sensing means respectively with both said speed governor and said second means, said fourth means being operable to simultaneously override both said speed governor and said second means thereby decreasing the fuel supply to said combustion chamber and increasing the nozzle exhaust area respectively when said maximum limit is attained.

2. The combination set forth in claim 1, wherein said compressor has an inlet and an outlet, and said sensing means comprises means for sensing the downstream pressure in said power plant remote from said compressor inlet.

3. The combination set forth in claim 1, wherein said sensing means comprises means for sensing the pressure in said power plant in proximity to the compressor outlet.

References Cited in the file of this patent

UNITED STATES PATENTS

| | | |
|---|---|---|
| 2,580,962 | Sedille | Jan. 1, 1952 |
| 2,606,420 | Moore | Aug. 12, 1952 |
| 2,641,324 | Fortescue | June 9, 1953 |
| 2,671,620 | Andrews | Mar. 9, 1954 |
| 2,688,844 | McLeod et al. | Sept. 14, 1954 |
| 2,737,015 | Wright | Mar. 6, 1956 |
| 2,820,340 | Dolza et al. | Jan. 21, 1958 |

FOREIGN PATENTS

| | | |
|---|---|---|
| 580,149 | Great Britain | Aug. 8, 1946 |
| 660,317 | Great Britain | Nov. 7, 1951 |